US010837363B2

(12) United States Patent
Blythe

(10) Patent No.: US 10,837,363 B2
(45) Date of Patent: Nov. 17, 2020

(54) SYSTEMS FOR AN ELECTRIC TURBOCHARGER

(71) Applicant: Transportation IP Holdings, LLC, Norwalk, CT (US)

(72) Inventor: Neil X. Blythe, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 25 days.

(21) Appl. No.: 16/251,998

(22) Filed: Jan. 18, 2019

(65) Prior Publication Data

US 2020/0232387 A1    Jul. 23, 2020

(51) Int. Cl.
*F02C 7/06* (2006.01)
*B61C 5/00* (2006.01)
*F02D 41/00* (2006.01)

(52) U.S. Cl.
CPC .............. *F02C 7/06* (2013.01); *B61C 5/00* (2013.01); *F02D 41/0007* (2013.01)

(58) Field of Classification Search
CPC ........ F02B 37/10; F02B 39/005; F02B 39/10; F01D 15/10; F01D 25/12; F01D 25/14; F01D 25/16; F04D 29/5806; H02K 5/20; H02K 7/08–088; H02K 7/1823; H02K 9/19; F05D 2220/40; F05D 2220/76; Y02T 10/144; F02C 6/12
See application file for complete search history.

(56) References Cited

U.S. PATENT DOCUMENTS

| 4,969,805 | A | * | 11/1990 | Romeo | ................... | F01D 25/24 |
| | | | | | | 417/360 |
| 6,499,969 | B1 | * | 12/2002 | Tombers | ................. | F01D 5/025 |
| | | | | | | 416/204 A |
| 7,174,714 | B2 | | 2/2007 | Algrain | | |
| 7,673,452 | B2 | * | 3/2010 | Shimizu | ................. | F02B 37/10 |
| | | | | | | 60/608 |

(Continued)

OTHER PUBLICATIONS

"Clean Diesel Engine Component Improvement Program—Diesel Engine Waste Heat Recovery—Utilizing Electric Turbocompound Technology," DOE Final Report 2004 DE-FC05-000R22810, Office of Scientific and Technical Information Website, Available Online at https://www.osti.gov/servlets/purl/862432, Dec. 17, 2004, 14 pages.

(Continued)

*Primary Examiner* — Jesse S Bogue
*Assistant Examiner* — Loren C Edwards
(74) *Attorney, Agent, or Firm* — McCoy Russell LLP

(57) ABSTRACT

Various systems are provided for an electric turbocharger. As one example, an electric turbocharger includes a turbine casing housing a turbine wheel and a compressor casing housing a compressor wheel, a bearing casing surrounding a shaft connecting the turbine wheel and the compressor wheel, the bearing casing split into a turbine bearing casing, compressor bearing casing, and a stator casing, the stator casing positioned between the turbine bearing casing and compressor bearing casing and housing an electric motor mounted on and around the shaft, and a plurality of bolts, each bolt of the plurality of bolts extending parallel to the shaft and from an outer face of the compressor bearing casing, through the stator casing and turbine bearing casing, and into the turbine casing.

20 Claims, 8 Drawing Sheets

(56) References Cited

U.S. PATENT DOCUMENTS

2018/0163737 A1* 6/2018 Merritt .................. F04D 29/051

OTHER PUBLICATIONS

Hopmann, U., "Diesel Engine Waste Heat Recovery Utilizing Electric Turbocompound Technology," Proceedings of the 2004 DEER Conference, Aug. 30, 2004, San Diego, California, 20 pages.
Gödeke, H. et al., "Hybrid Turbocharger with Innovative Electric Motor," MTZ Worldwide, vol. 75, No. 3, Mar. 2014, 6 pages.
Shiraishi, K. et al., "Electro-Assist Turbo for Marine Turbocharged Diesel Engines," Proceedings of ASME Turbo Expo 2014: Turbine Technical Conference and Exposition, Jun. 16, 2014, Dusseldorf, Germany, 8 pages.

* cited by examiner

SYSTEMS FOR AN ELECTRIC TURBOCHARGER

BACKGROUND

Technical Field

Embodiments of the subject matter disclosed herein relate to an electric turbocharger which may be used in an engine system.

Discussion of Art

Engine systems, such as those included in a vehicle (e.g., a locomotive), may include a turbocharger to increase a pressure (e.g., boost) of air provided to an intake of an engine. The turbocharger may include a compressor driven by a turbine, via a shaft, the turbine arranged in an exhaust passage of the engine and the compressor arranged in an intake passage of the engine. Thus, combusted exhaust gases may drive rotation of the turbine which, in turn, drives rotation of the compressor, thereby providing power to boost the incoming intake air. In some examples, the turbocharger may include a motor/generator that drives rotation of the turbocharger and/or is driven by the turbocharger, thereby providing additional boost pressure to the engine, as needed, and/or generating power from rotation of the turbocharger.

BRIEF DESCRIPTION

In one embodiment, an electric turbocharger comprises a turbine casing housing a turbine wheel and a compressor casing housing a compressor wheel; a bearing casing surrounding a shaft connecting the turbine wheel and the compressor wheel, the bearing casing split into a turbine bearing casing, compressor bearing casing, and a stator casing, the stator casing positioned between the turbine bearing casing and compressor bearing casing and housing an electric motor mounted on and around the shaft; and a plurality of bolts, each bolt of the plurality of bolts extending parallel to the shaft and from an outer face of the compressor bearing casing, through the stator casing and turbine bearing casing, and into the turbine casing.

DETAILED DESCRIPTION

The following description relates to embodiments of an electric turbocharger. As one example, the electric turbocharger includes a turbine casing housing a turbine wheel and a compressor casing housing a compressor wheel; a bearing casing surrounding a shaft connecting the turbine wheel and the compressor wheel, the bearing casing split into a turbine bearing casing, compressor bearing casing, and a stator casing, the stator casing positioned between the turbine bearing casing and compressor bearing casing and housing an electric motor mounted on and around the shaft; and a plurality of bolts, each bolt of the plurality of bolts extending parallel to the shaft and from an outer face of the compressor bearing casing, through the stator casing and turbine bearing casing, and into the turbine casing. In one embodiment, the electric turbocharger is included in an engine system of a locomotive. In another embodiment, the electric turbocharger may be an electric motor/generator adapted to drive rotation of the shaft and/or be driven by and generate energy from rotation of the shaft.

Figure 1:
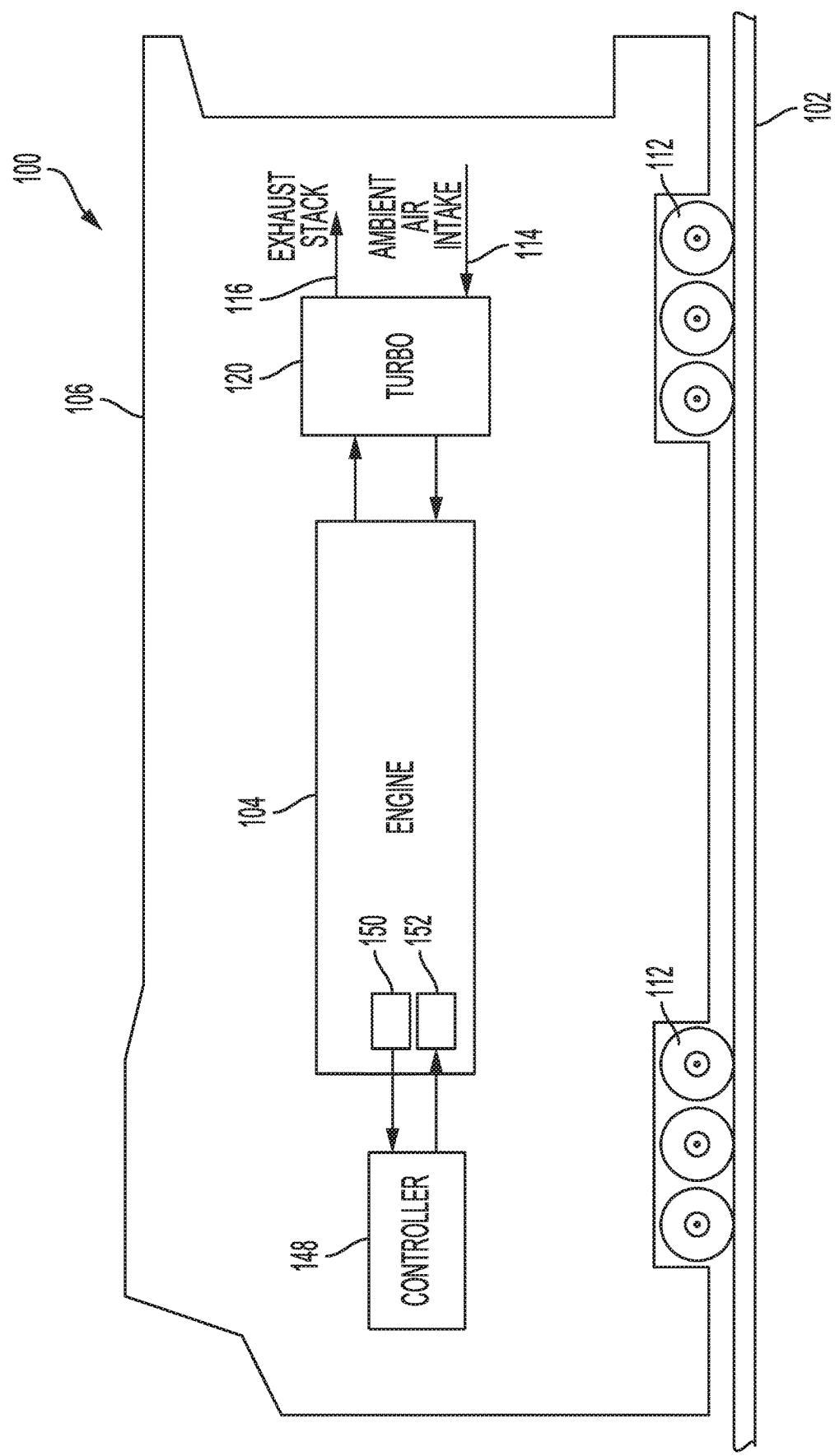
FIG. 1 shows a schematic diagram of a vehicle with an engine comprising a turbocharger arrangement, according to an embodiment.
Figure 2:
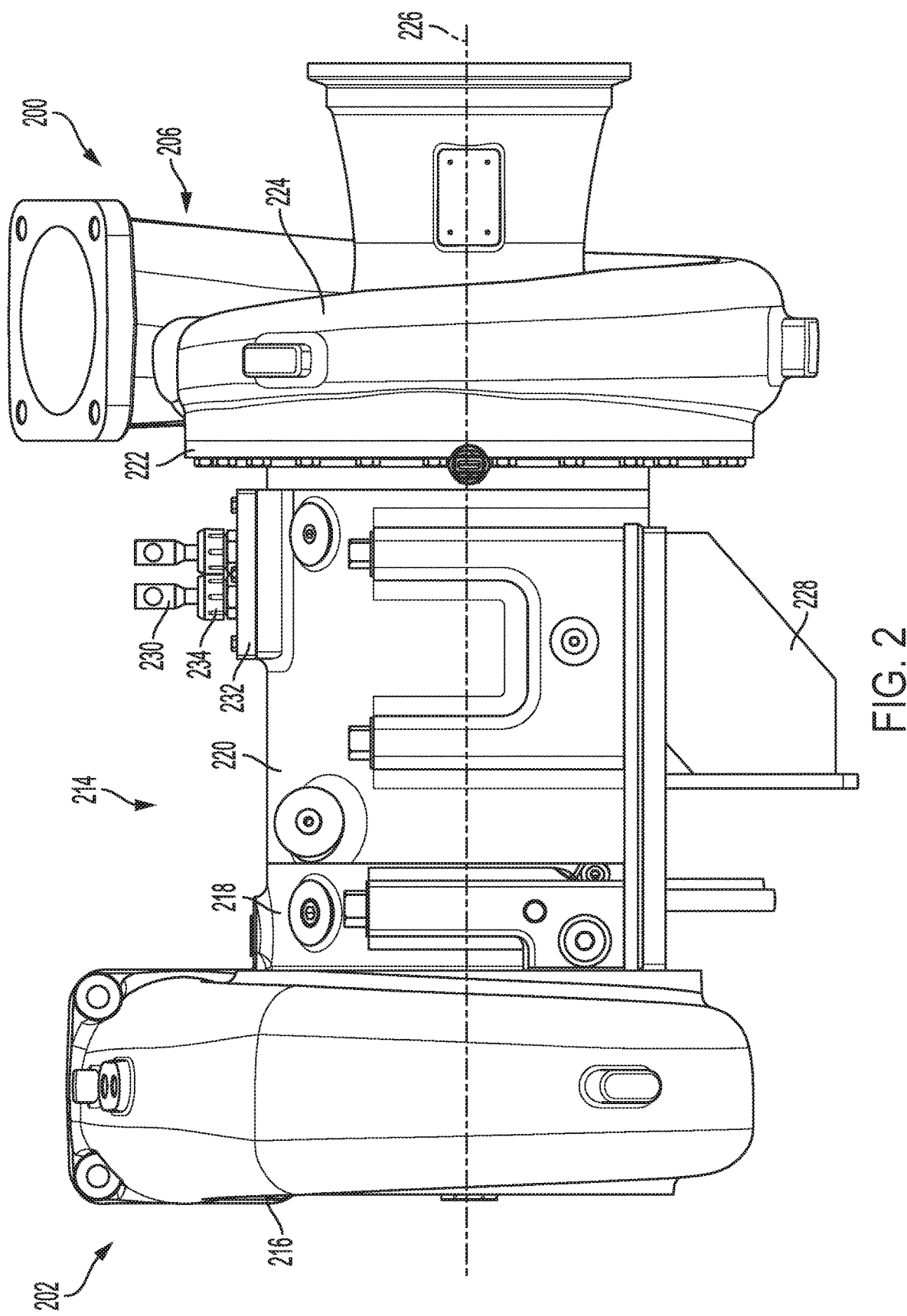
FIG. 2 shows an external view of a casing of a turbocharger, according to an embodiment.

As one example, the electric turbocharger may be installed in an engine system of a vehicle, such as the engine system of the rail vehicle shown in FIG. 1. An embodiment of the electric turbocharger, which includes five casing components coupled to one another to form the turbocharger, is shown in FIGS. 2-8. An exterior view of the five casing components coupled to one another is shown in FIG. 2, while various internal, cross-sectional views of the turbocharger are shown in FIGS. 3-8.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the arrangement for the electric turbocharger, an example platform in which the electric turbocharger may be installed is shown. FIG. 1 shows a block diagram of an embodiment of a vehicle system 100 (e.g., a locomotive system), herein depicted as vehicle 106. The illustrated vehicle is a rail vehicle (e.g., locomotive) configured to run on a rail 102 via a plurality of wheels 112. As depicted, the vehicle includes an engine system with an engine 104.

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system includes a turbocharger 120 ("TURBO") that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages. In one example, the turbocharger 120 may be an electric turbocharger including an electric motor coupled to a shaft of the turbocharger. In some embodiments, the turbocharger 120 may additionally be a radial turbocharger. An embodiment for an electric turbocharger, which may be used as turbocharger 120 in FIG. 1, is described in greater detail below with reference to FIGS. 2-8.

In some embodiments, the engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NOx trap, as well as filters or other systems and devices.

A controller 148 may be employed to control various components related to the vehicle system. In one example, the controller includes a computer control system. The controller further includes computer readable storage media (not shown) including code for enabling on-board monitoring and control of rail vehicle operation. The controller, while overseeing control and management of the vehicle system, may receive signals from a variety of sensors 150 to determine operating parameters and operating conditions, and correspondingly adjust various engine actuators 152 to control operation of the vehicle. For example, the controller may receive signals from various engine sensors including, but not limited to, engine speed, engine load, boost pressure, exhaust pressure, ambient pressure, exhaust temperature, and the like. Correspondingly, the controller may control aspects and operations of the vehicle system by sending commands to various components such as traction motors, alternator, cylinder valves, throttle, and the like.

Figure 3:
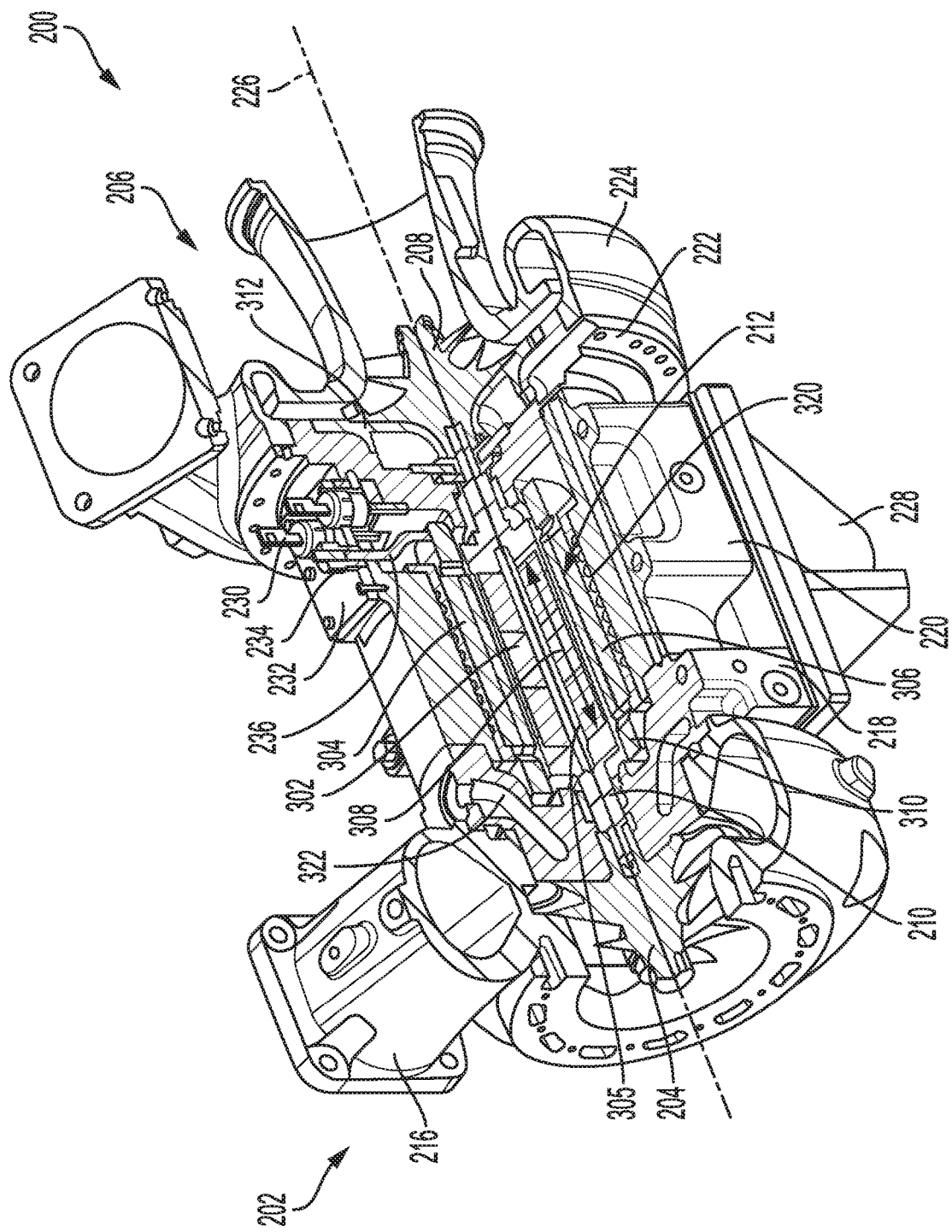
FIG. 3 shows a sectional, perspective view of the turbocharger.
Figure 4:
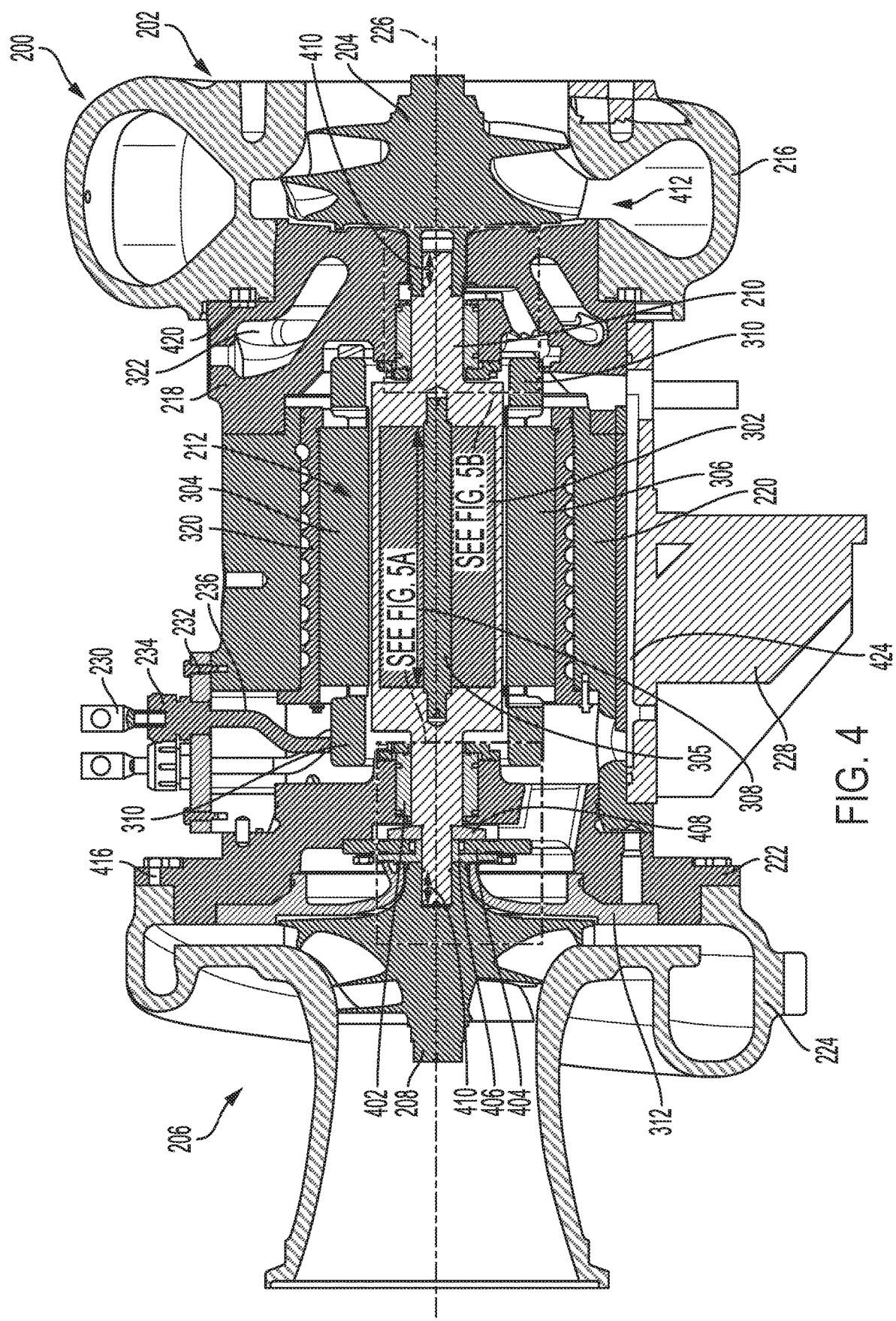
FIG. 4 shows a first cross-sectional view of the turbocharger.
Figure 5B:
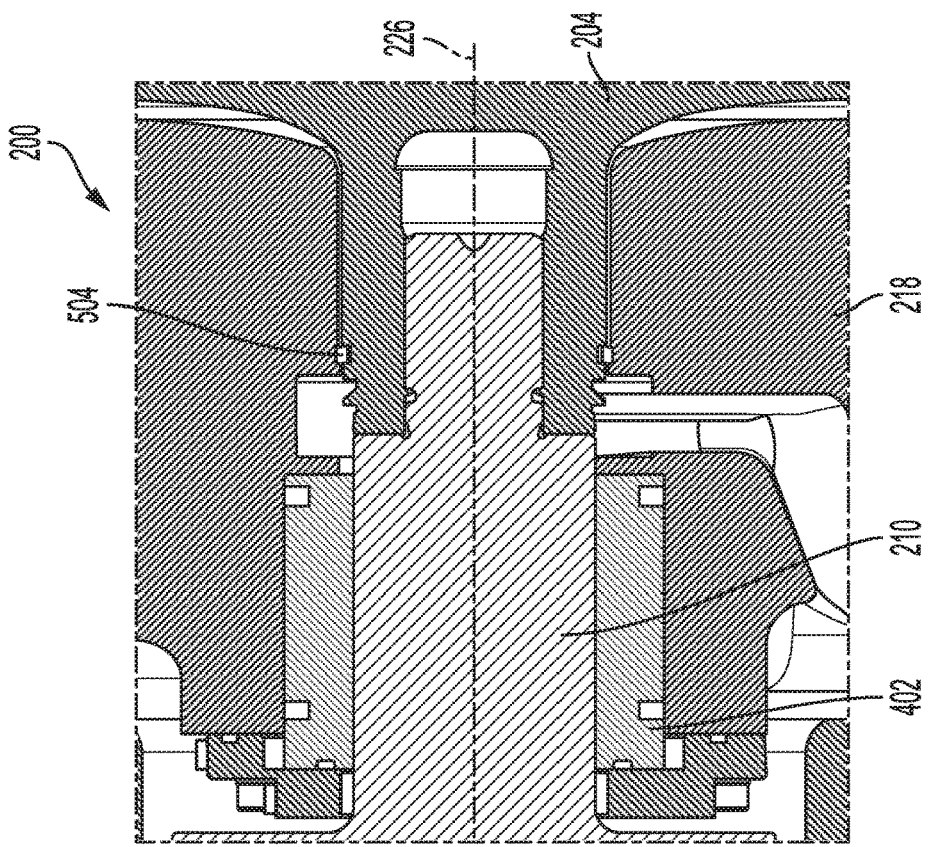
FIGS. 5A-5B show zoomed-in, cross-sectional views of portions of the turbocharger.
Figure 5A:
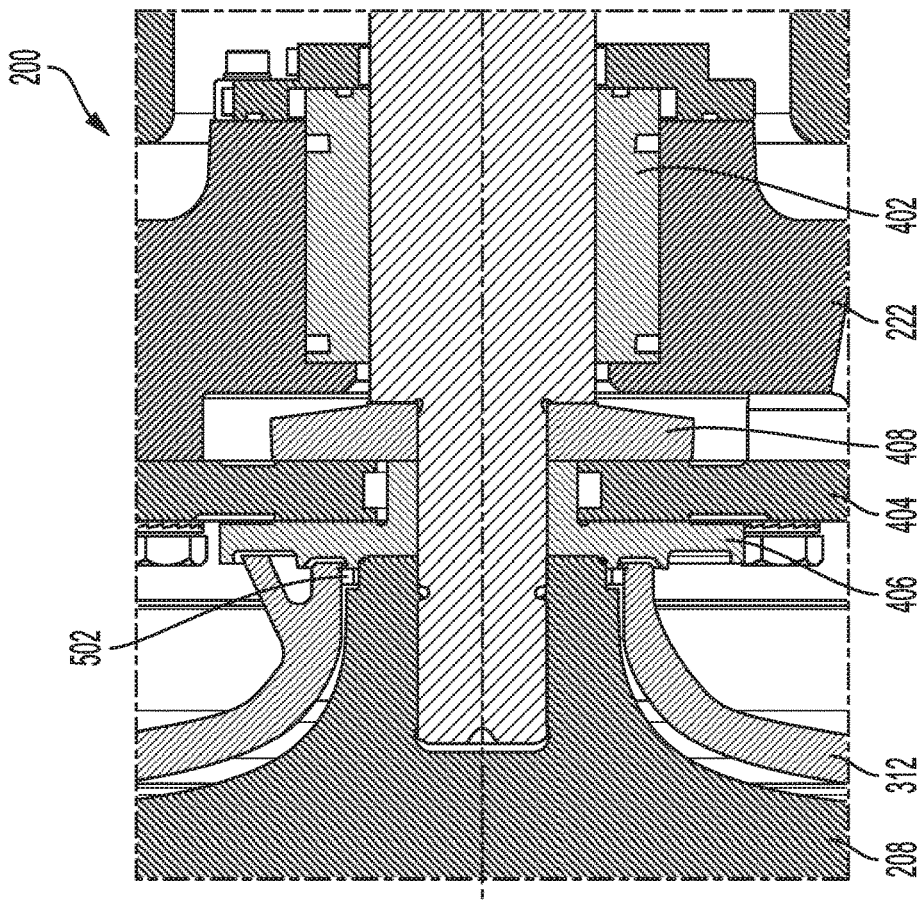
Figure 6:
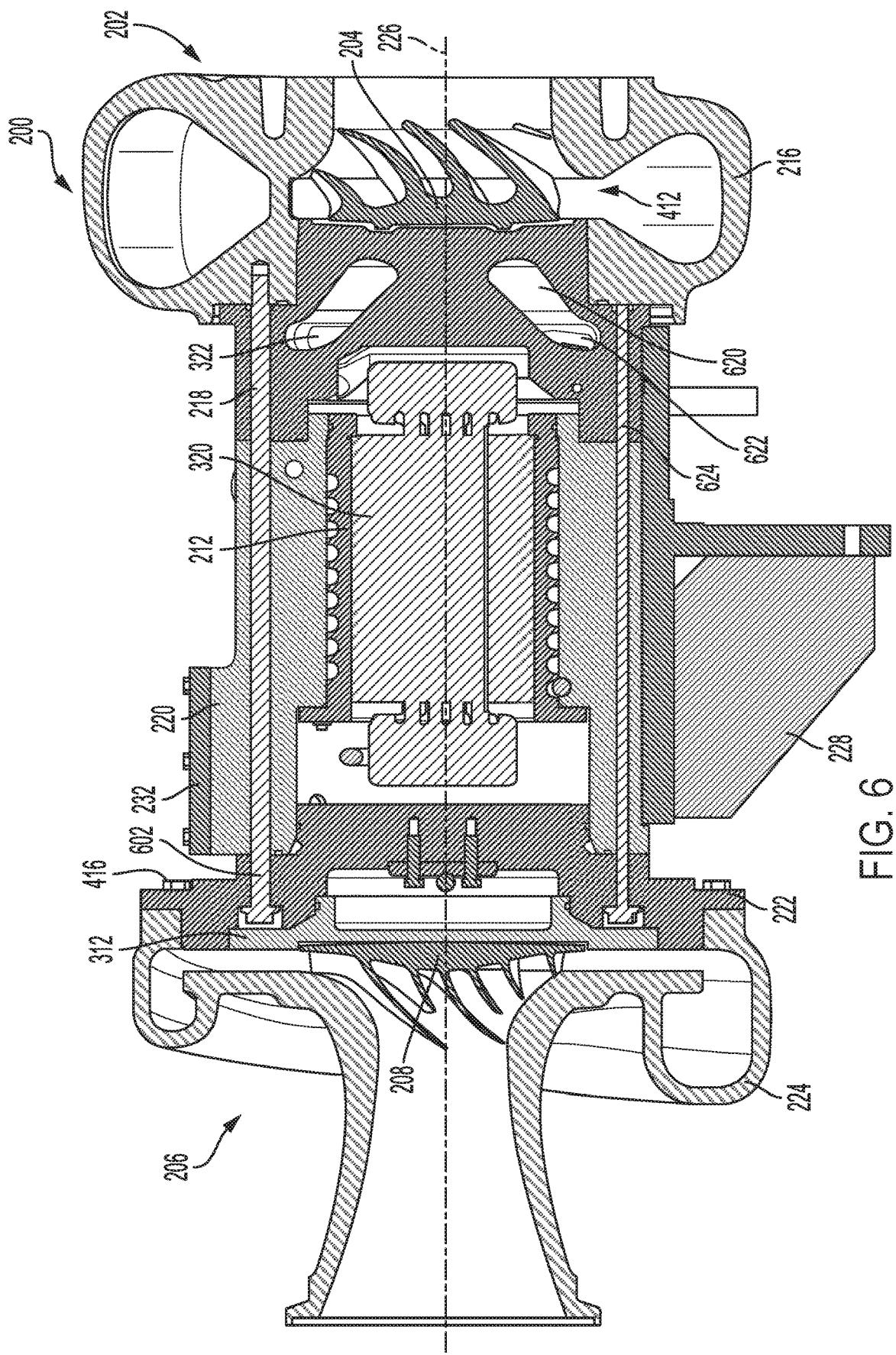
FIG. 6 shows a second cross-sectional view of the turbocharger.
Figure 7:
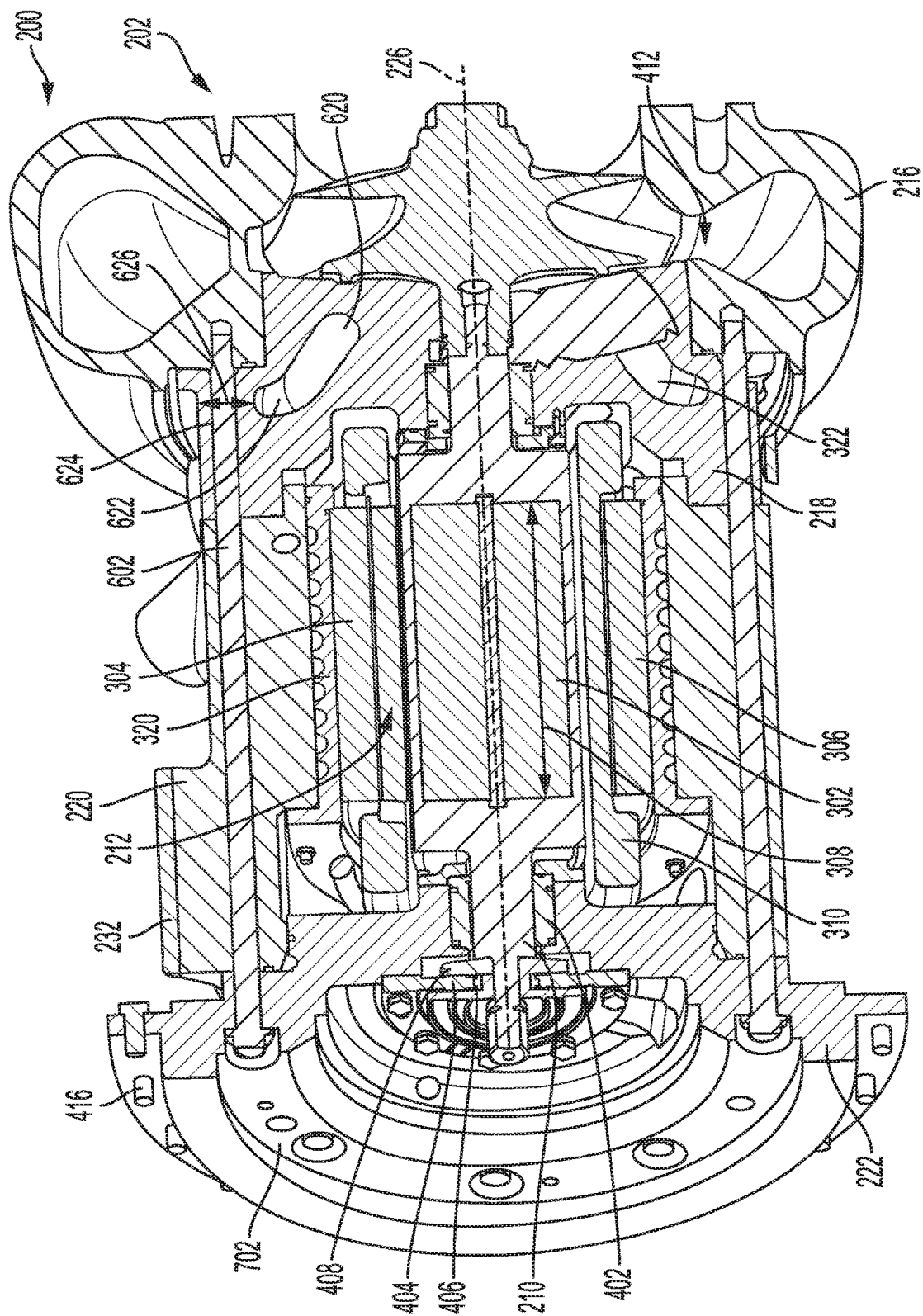
FIG. 7 shows a third cross-sectional, perspective view of the turbocharger, with a compressor casing removed.
Figure 8:
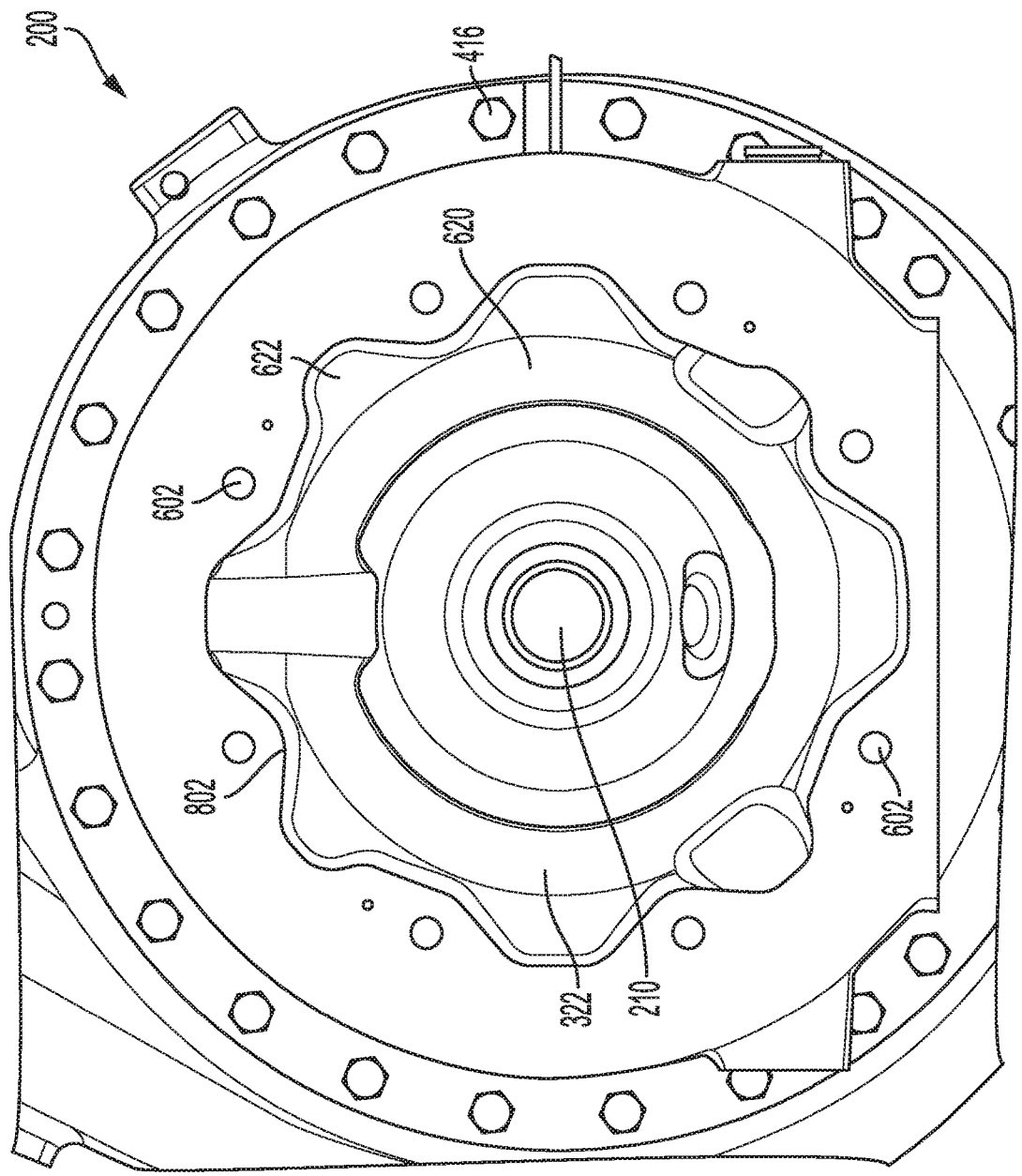
FIG. 8 shows a cross-sectional view of the turbocharger showing a water jacket arranged in a turbine bearing casing of the turbocharger.

Turning now to FIGS. 2-7, an embodiment of an electric turbocharger, which may be used as turbocharger 120 in the system of FIG. 1, is shown. Specifically, FIGS. 2-7 show a turbocharger 200 including a turbine 202 and a compressor 206, where a turbine wheel 204 of the turbine is rotationally coupled to a compressor wheel 208 of the compressor via a shaft 210. The turbocharger further includes an electric motor 212 coupled with the shaft such that the motor may drive rotation of and/or be driven by the shaft. FIG. 2 shows an external view of the turbocharger 200, FIG. 3 shows a sectional, perspective view of the turbocharger 200, FIG. 4 shows a first cross-sectional view of the turbocharger 200, FIGS. 5A-5B show zoomed-in, cross-sectional views of portions of the turbocharger 200, FIG. 6 shows a second cross-sectional view of the turbocharger 200, FIG. 7 shows a third cross-sectional, perspective view of the turbocharger 200, with a compressor casing removed, and FIG. 8 shows a cross-sectional view of the turbocharger 200 showing a second water jacket arranged in a turbine bearing casing of the turbocharger 200.

As shown in FIG. 2, the turbocharger includes an outer casing 214 comprising a turbine casing 216, a turbine bearing casing 218, a stator casing 220, a compressor bearing casing 222, and a compressor casing 224, all coupled to one another. The turbine bearing casing, stator casing, and compressor bearing casing make up a bearing casing of the outer casing, the bearing casing positioned between the turbine casing and the compressor casing without additional components positioned therebetween. Further, as shown in FIGS. 2-4 and 6, the compressor casing is directly coupled to the compressor bearing casing (where directly coupled is defined as being directly coupled to a component without additional intervening components positioned therebetween), the compressor bearing casing is directly coupled to each of the compressor casing and the stator casing, the stator casing is directly coupled to each of the compressor bearing casing and the turbine bearing casing, the turbine bearing casing is directly coupled to each of the stator casing and the turbine casing, and the turbine casing is directly coupled to the turbine bearing casing. In this way, an entire casing of the turbocharger consists of only five casing parts coupled to one another along a central axis 226 of the turbocharger, the shaft arranged coaxial with the central axis.

The turbocharger may also include an adaptor bracket 228, as shown in FIGS. 2-4 and 6. The adaptor bracket is directly coupled to a first side (e.g., a bottom side with respect to gravity and a surface on which the turbocharger sits when installed into a system, such as an engine system) of the turbine bearing casing and the stator casing. The adaptor bracket may be shaped and configured to mount the turbocharger to another component. A cavity 424 is arranged at an interface between the adaptor bracket and an outer surface of the stator casing (on a bottom side of the turbocharger). For example, the cavity may be recessed into a top surface of the adaptor bracket. The cavity serves as an oil drain passage in fluid communication with a compressor side bearing oil drain (adapted to receive oil draining from the bearings in the compressor bearing casing) and a turbine side bearing oil drain (adapted to receive oil draining from the bearing in the turbine bearing casing).

A plurality of electrical contacts 230 are arranged at a second side (e.g., top side) of the stator casing, the second side arranged opposite the first side. The electrical contacts may also be referred to as electrical connectors and are adapted to transfer electrical energy between a power source and internal circuitry of the electrical motor arranged inside the stator housing. Each of the electrical contacts is coupled to a mounting plate 232 coupled to the second side of the stator casing via a corresponding connector 234 (as shown in FIGS. 2 and 3). As shown in FIGS. 3 and 4, each of the electrical contacts is arranged on an exterior of the stator casing (e.g., external to components arranged within an interior of the stator casing) and extend outward and away from an outer surface of the stator casing, in a direction perpendicular to the central axis. As shown in FIGS. 3 and 4 and discussed further below, each electrical contact is connected to internal circuitry of the electric motor via an electrical connection 236 (e.g., one electrical connection per electrical contact). Additionally, the plurality of electrical contacts are arranged on a compressor side of the stator casing, adjacent to the compressor bearing casing (e.g., at a position on the stator casing that is arranged adjacent to where the stator casing directly couples to the compressor bearing casing).

The electric motor 212 is mounted on and around the shaft, as shown in FIGS. 3, 4, and 7. The electric motor includes a rotor 302 and stator 304, the stator surrounding the rotor around a circumference of the rotor. In one embodiment, the electric motor is a permanent magnet motor. In another embodiment, the electric motor is an induction motor. Further, in one embodiment, as shown in FIGS. 3, 4, and 7, the rotor is integrated into the shaft and the stator surrounds the shaft, around an entire circumference of the shaft, in the region of the shaft that contains the rotor. The rotor includes the magnet(s) of the electric motor which are held together via an internal shaft 305 (inside the shaft of the turbocharger that connects the turbine wheel and compressor wheel) that is coaxial with the central axis, as shown in FIGS. 3 and 4. The rotor extends only along a portion of an entire length of the turbocharger shaft, in a central portion of the shaft. The stator includes a central portion 306 surrounding the rotor, along a length 308 of the rotor, and end turns 310 extending outward from the central portion, in a direction of the central axis, past ends of the rotor. Further, as shown in FIGS. 4 and 7, the end turns extend outward from the central portion 306 of the stator, on either side of the central portion and in a direction of the central axis, and over a portion of sleeve-type bearings (referred to herein as sleeve bearings) 402 of the shaft (one sleeve bearing arranged on either side of the rotor), so that the end turns at least partially surround (in a radial direction relative to the central axis) the sleeve bearings (e.g., the end turns are arranged at a same axial position as a portion of the sleeve bearings, on either side of the central portion of the stator).

The end turns include internal circuitry of the stator. As shown in FIGS. 3 and 4, internal circuitry of the end turns of the stator is electrically coupled to the electrical contacts 230 via electrical connections 236 running through an interior of the stator casing, from the stator end turns to the electrical contacts. By having end turns that extend outward from the central portion of the stator, to an axial position arranged over (in the radial direction) the sleeve bearings, the electrical connections may be routed through the stator casing without coming into contact with additional components inside the stator casing, such as a water jacket, as described further below. The electrical connections extend from the end turns to the electrical connections in a portion of the stator casing that is arranged closer to the compressor bearing casing than the turbine bearing casing. In this way, electrical power (from an external power source) may be provided to the stator, via the electrical contacts, electrical connections, and the end turns.

As shown in FIGS. 4, 5A, 5B, and 7, there are two sleeve bearings 402 surrounding different portions of the shaft 210. The two sleeve bearings 402 include a first sleeve bearing arranged in the compressor bearing casing and a second sleeve bearing arranged in the turbine bearing casing. The turbocharger shaft turns (e.g., rotates) with reduced or no friction on an oil film provided inside the sleeve bearings. In one example, the oil supply to the sleeve bearings may come from an engine oil circuit of an engine system in which the turbocharger is installed. The sleeve bearings may be more robust and able to withstand a higher load than different types of bearings (such as roller bearings).

The turbocharger also includes a thrust bearing 404 arranged around the shaft in the compressor bearing casing, the thrust bearing arranged outside of the first sleeve bearing, between an end of the shaft directly coupled to the compressor wheel and the first sleeve bearing (as seen in FIGS. 4, 5A, and 7). FIG. 7 shows an end view of the thrust bearing since the compressor casing is removed in the view of FIG. 7. As shown in FIG. 7, the thrust bearing is fastened to an end face of the compressor bearing housing via a plurality of fasteners (e.g., bolts) arranged around a circumference of the thrust bearing. An oil flinger 406 is arranged on a first side of the thrust bearing, the first side arranged proximate to the compressor wheel, and a thrust collar 408 is arranged on an opposite, second side of the thrust bearing, the second side arranged proximate to the first sleeve bearing. In this way, the thrust bearing is sandwiched between, in the axial direction, the thrust collar and oil flinger.

As shown in FIGS. 5A and 5B, the turbocharger includes only one (e.g., a single) piston ring seal at each end of the shaft. Specifically, the turbocharger includes a first piston ring seal 502 arranged around an inner end of the compressor wheel (e.g., the end facing the bearing casing), between the compressor wheel and a seal plate 312 attached to the compressor bearing housing and a second piston ring seal 504 arranged around an inner end (e.g., the end facing the bearing casing) of the turbine wheel, between the turbine wheel and the turbine bearing casing. The seal plate is adapted to keep oil out of the compressor wheel area. Specifically, the seal plate separates an oil side from an air side of the compressor wheel. As shown in FIGS. 5A and 5B, the first piston ring seal is housed at an inner diameter of the seal plate and thus prevents oil from migrating into the space on the back side of the compressor wheel where it may get carried into the air stream of the engine. As shown in FIGS. 3, and 4-6, the seal plate 312 separates the oil side of the compressor bearing casing from the air side and is adapted to keep oil from mixing with compressed air.

As shown in FIGS. 3-5A, the compressor wheel 208 is boreless, meaning that there is no bore (e.g., channel or aperture) extending through an entire length, defined in a direction of the central axis 226, of the compressor wheel for coupling to the shaft. For example, the shaft does not extend through an entirety of the compressor wheel or through an entirety of the turbine wheel. Instead, a first end of the shaft is threaded into an internal end of the compressor wheel and a second end of the shaft is threaded into an internal end of the turbine wheel. The internal ends of the turbine wheel and compressor wheel face the bearing casing. Thus, the shaft extends only a portion of a distance 410 into each of the turbine wheel and compressor wheel, the distance arranged coaxial with the central axis. A remainder of the compressor wheel, for example, may be solid. For example, as shown in FIGS. 3 and 4, the portion of the distance into the turbine wheel is arranged inward, in a direction of the rotational axis and relative to the bearing casing, of blades of the turbine wheel and the portion of the distance into the compressor wheel is arranged inward of blades of the compressor wheel. Said another way, the portion of the distance into the turbine wheel extends from the inner end of the turbine wheel to a location before the innermost blade (e.g., blade arranged closest to the bearing casing relative to the other blades) of the turbine wheel and the portion of the distance into the compressor wheel extends from the inner end of the compressor wheel to a location before the innermost blade (e.g., blade arranged closest to the bearing casing relative to the other blades) of the compressor wheel. In this way, by extending only the portion of the distance into each of the compressor wheel and turbine wheel, a length of the shaft 210, the length defined in a direction of the central axis, is reduced (compared to turbocharger shafts extending all the way through a compressor wheel and that may extend past and be bolted to an outer end of the compressor wheel). Further, by including boreless compressor wheel, stresses on the compressor wheel are reduced, thereby increasing a durability of the compressor wheel.

Additionally, as shown in FIGS. 4 and 7, the turbine casing 216 includes a vaneless turbine nozzle 412 integrated as one piece with a remainder of the turbine casing. The turbine nozzle directs gas flow from the volute of the turbine casing to the turbine wheel. Specifically, the turbine nozzle 412, formed by walls of the turbine casing, does not include any vanes and thus the turbine does not include a nozzle ring holding vanes (which would be formed as an additional component). In this way, a number of components of the turbocharger is reduced, thereby strengthening the turbine casing-turbine bearing casing joint (e.g., coupling interface).

As shown in FIG. 8, a plurality of bolts 602 (which may be referred to as long blots) are arranged around a circumference of the bearing casing. As shown in FIGS. 6 and 7, each bolt of the plurality of bolts extends in a direction parallel to the shaft (and the central axis), from an outer face 702 of the compressor bearing casing, through the stator casing and turbine bearing casing, and partway into (an interior of) the turbine casing. The head of each of the bolts 602 may be arranged in a respective depression in the outer face, the depressions shaped to receive the head of the bolt. By having a plurality of long bolts 602 that extend through a majority of the turbocharger casing components, and couple together the compressor bearing casing, stator casing, turbine bearing casing, and turbine casing, a compliance of the bolted joints are increased and the coupling of casing components is made more robust.

The compressor bearing casing is coupled to the compressor casing via a plurality of fasteners 416 arranged around an outer flange of the compressor bearing casing, around a circumference of the outer flange, as shown in FIGS. 4, 6, and 7. The plurality of bolts are arranged in the compressor bearing casing at a radial position that is closer to the central axis of the shaft than the plurality of fasteners, as shown in FIG. 8. Said another way, the fasteners are arranged radially outside the bolts, relative to the central axis.

The casing of the turbocharger includes a cooling system that includes a plurality of water jackets, as shown in FIGS. 3, 4, and 6-8. The plurality of water jackets includes a first water jacket 320 arranged within the stator casing, which is adapted to provide cooling to the stator, and a second water jacket 322 arranged within the turbine bearing casing and is adapted to provide cooling to the bearings and other components of the turbine bearing casing. The first and second water jackets may be the only cooling system components of the turbocharger. For example, the entire casing of the turbocharger may not include any additional water jackets or additional air cooling, other than the first and second water jackets described herein. For example, the turbine casing does not include any water-cooling or air-cooling, and thus there is a relatively larger thermal gradient between the turbine bearing casing and the turbine casing. As described above, certain features of the turbine bearing casing, such as the shape and positioning of the second water jacket 322 and additional thermal relief features (e.g., grooves) may reduce thermal stresses created by this relatively large thermal gradient. In one embodiment, the first water jacket and second water jacket may be fluidly coupled to one another. In another example, the first water jacket and second water jacket may each receive cooling fluid (e.g., water) from an engine cooling system.

The first water jacket 320 is positioned within a space that separates the stator 304 from an inner surface of the stator casing (as shown in FIG. 4), inside the stator casing, where the space is positioned between an outer surface of the stator and an inner surface of the stator casing, around an entire circumference of the stator, in a radial direction that is perpendicular to the central axis. Additionally, the first water jacket extends along an entire length of the central portion of the stator, the length defined along a direction that is parallel with the central axis. In this way, the first water jacket surrounds the stator, around an entire circumference of the stator and along an entire length of the stator, thereby providing increased cooling, via removing heat, to the stator.

The second water jacket 322, arranged within the turbine bearing casing, surrounds a portion of the shaft which runs through the bearing casing (e.g., proximate to the turbine end of the turbocharger. In this way, the turbine bearing casing is water-cooled (or liquid-cooled). As shown in FIGS. 7 and 8, the second water jacket 322 includes an annular portion 620 surrounding the portion of the shaft arranged in the turbine bearing casing and a plurality of extending portions 622, each extending outward from the annular portion, relative to the shaft, and spaced apart from adjacent extending portions of the plurality of extending portions. Additionally, outer ends (e.g., ends farthest away from the central axis in the radial direction) of the extending portions are spaced apart from an outer surface 624 of the turbine bearing casing via a space 626, as shown in FIG. 7. The extra material of the turbine bearing case, created by the space 626, may be generated to support the turbine casing and other materials of the turbocharger.

The second water jacket may be biased toward the turbine casing while being arranged in the turbine bearing casing. Said another way, the second water jacket is arranged within the turbine bearing casing, closer to the turbine casing than the compressor casing. In one example, a portion of the second water jacket nearest the turbine wheel extends into a region of the turbine bearing case that is between, in a direction along the central axis, the turbine wheel and the sleeve bearing. This may be achieved due to the turbine nozzle being vaneless and free of a turbine nozzle ring (e.g., turbine nozzle is integrally formed in the turbine case by walls of the turbine case). The second water jacket is arranged adjacent to the turbine casing since the turbine nozzle is integrally formed with the turbine casing (and thus there is no nozzle ring) and the turbine is free of a heat shield. Since there is a larger thermal gradient between the turbine casing and turbine bearing casing, created by the water-cooled (via the second water jacket) turbine bearing casing and non-cooled turbine casing coupled to one another, slippage between parts in the turbine case-turbine bearing case joint (e.g., where they are coupled to one another) may occur. However, by reducing the number of components at this joint, as done in the turbocharger shown in the figures described herein by not having a nozzle ring and heat shield (parts in addition to the turbine casing and turbine bearing casing), slippage between the parts is reduced.

As shown in FIG. 8, each bolt 602 of the plurality of bolts is positioned between a different pair of adjacent extending portions 622 of the second water jacket 322. However, each bolt is spaced a distance away from, in a circumferential direction relative to the central axis, the adjacently arranged extending portions which it is positioned between. Additionally, the second water jacket includes smooth, curved transitions 802 between each extending portion of the plurality of extending portions and the annular portion. By shaping the surface of the second water jacket to be smooth, concentrations of stress may be spread out more evenly while allowing the water jacket to comprise extending portions, which may provide increased cooling to the turbine bearing casing. This may decrease stress on the bolts 602 and other features of the turbocharger.

As shown in FIG. 4, a thermal relief groove 420 is arranged in the turbine bearing casing between, in a direction of the central axis, the turbine casing and the second water jacket 322. In particular, the groove 420 is depressed into a portion of a face of the turbine bearing casing that has face-sharing contact with the turbine casing, the arranged adjacent to one extending portion of the plurality of extending portions. The groove may be shaped to reduce a contact area between the non-cooled turbine casing and the water-cooled turbine bearing case. This may decrease heat transfer between the turbine casing and the turbine bearing casing, thereby providing thermal relief, and reducing thermal stress and possible degradation of the turbine bearing casing-turbine casing joint. The groove may extend at least partially around a circumference of the turbine bearing casing. In some examples, the groove is continuous and extends around an entire circumference of the turbine bearing casing. In other examples, additionally or alternatively, the groove may be a plurality of discontinuous grooves spaced apart from one another along a single circumference of the turbine bearing casing. A size of the groove may be adjusted based on a size of the turbocharger and the second water jacket. In one example, the size of the groove may be decreased if the size of the second water jacket is increased. As another examples, the size of the groove may be increased as the size of the turbocharger is increased. The groove may be sized to achieve a desired temperature gradient across the turbocharger such that overheating of components between the turbine and the compressor is reduced.

FIGS. 2-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, an electric turbocharger including an electric motor includes a plurality of casing components coupled to one another. In particular, the turbocharger may include only five casing components coupled to one another to form a casing that houses a turbine wheel, compressor wheel, turbocharger shaft, bearings for the shaft, and the electric motor, the five casing components including a compressor casing, compressor bearing casing, a stator casing, a turbine bearing casing, and a turbine casing. By having a turbocharger casing made of fewer components, a robustness of the turbocharger casing is increased and degradation between the joints coupling adjacent casing components is reduced. The shaft length of the turbocharger is reduced by connecting the shaft only to inner ends of the turbine wheel and compressor wheel, without the shaft extending through an entirety of either the turbine wheel or compressor wheel. As a result, the compressor wheel is boreless which reduces stresses on the compressor wheel and increases durability. Additionally, the electric motor includes a rotor integrated into and around a central portion of the turbocharger shaft and a stator surrounding the rotor, within the stator casing. The stator includes end turns that extend outward from a central portion of the stator, to an axial position that surrounds a portion of sleeve bearings of the shaft. As a result, internal circuitry of the stator, arranged within the end turns, may be electrically coupled to electrical contacts on an exterior of the stator casing via electrical connections routed through an interior of the stator casing. This provides for a more compact turbocharger arrangement which is made even more compact via having a turbine nozzle that is integrated with the turbine casing (e.g., no additional turbine nozzle ring) and having no heat shield. The longer bolts that run through an entirety of the bearing casing, from a face of the compressor bearing casing that faces the compressor casing to and through a portion of the turbine casing increase a compliance of the bolts, thereby reducing degradation of the bolts and the coupling interfaces between the adjacently arranged casing components. The cooling system of the turbocharger is simplified by having no air cooling and just providing a first water jacket surrounding the stator, within the stator casing, and a second water jacket in the turbine bearing casing. Thermal stresses due to the thermal gradient between the turbine bearing casing and turbine casing are reduced by additional features, such as the shape of the second water jacket and thermal relief grooves in the turbine bearing casing. All these features of the electric turbocharger work together create a more compact turbocharger that is more robust and has reduced stress concentrations due to thermal gradients and bolted connections between components. Further, the specific placing of the electric turbocharger, mounted on the turbocharger shaft between the turbine and compressor wheel provides for a more compact arrangement which eliminates the need for separate bearings, oil supply, cooling system, and structural support of the motor. In contrast, attaching the electric motor to the end of the turbine (which would create issues due to the hot exhaust) or attaching the electric motor to the end of the compressor would result in a bulkier turbocharger requiring separate bearings, oil supply, cooling, and structural support for the motor. Thus, the technical effect of an electric turbocharger including a turbine casing housing a turbine wheel and a compressor casing housing a compressor wheel; a bearing casing surrounding a shaft connecting the turbine wheel and the compressor wheel, the bearing casing split into a turbine bearing casing, compressor bearing casing, and a stator casing, the stator casing positioned between the turbine bearing casing and compressor bearing casing and housing an electric motor mounted on and around the shaft; and a plurality of bolts, each bolt of the plurality of bolts extending parallel to the shaft and from an outer face of the compressor bearing casing, through the stator casing and turbine bearing casing, and into the turbine casing is to provide a more compact electric turbocharger with increased durability and which can handle increased loads.

As one embodiment, an electric turbocharger for a locomotive includes a turbine casing housing a turbine wheel and a compressor casing housing a compressor wheel; a bearing casing surrounding a shaft connecting the turbine wheel and the compressor wheel, the bearing casing split into a turbine bearing casing, compressor bearing casing, and a stator casing, the stator casing positioned between the turbine bearing casing and compressor bearing casing and housing an electric motor mounted on and around the shaft; and a plurality of bolts, each bolt of the plurality of bolts extending parallel to the shaft and from an outer face of the compressor bearing casing, through the stator casing and the turbine bearing casing, and into the turbine casing. In a first example of the electric turbocharger, the shaft couples to innermost ends of each of the turbine wheel and the compressor wheel through respective threaded joints, the innermost ends being ends of the respective turbine wheel and compressor wheel arranged closest to the bearing casing. A second example of the electric turbocharger optionally includes the first example and further includes, wherein the electric motor is a permanent magnet motor including a rotor integrated into the shaft and a stator surrounding the rotor, around an outer circumference of the rotor. A third example of the electric turbocharger optionally includes one or more of the first and second examples and further includes, wherein the stator includes a central portion surrounding the rotor, along a length of the rotor, and end turns extending outward from the central portion, in a direction of a rotational axis of the shaft, past ends of the rotor and over a portion of bearings of the shaft. A fourth example of the electric turbocharger optionally includes one or more of the first through third examples and further includes, wherein the bearings of the shaft include two sleeve bearings surrounding the shaft, a first sleeve bearing of the two sleeve bearings arranged in the compressor bearing casing and a second sleeve bearing of the two sleeve bearings arranged in the turbine bearing casing. A fifth example of the electric turbocharger optionally includes one or more of the first through fourth examples and further includes a thrust bearing arranged around the shaft in the compressor bearing casing, the thrust bearing arranged outside of the first sleeve bearing, between an end of the shaft directly coupled to the compressor wheel and the first sleeve bearing. A sixth example of the electric turbocharger optionally includes one or more of the first through fifth examples and further includes, wherein the end turns include internal circuitry of the stator, where the internal circuitry of the stator is electrically coupled to electrical contacts arranged on an exterior of the stator casing via electrical connections running through the stator casing, from the end turns to the electrical contacts. A seventh example of the electric turbocharger optionally includes one or more of the first through sixth examples and further includes, wherein the electrical contacts are arranged on a compressor side of the stator casing, adjacent to the compressor bearing casing, and wherein the electrical contacts extend outward from an outer surface of the stator casing, in direction perpendicular to the rotational axis. An eighth example of the electric turbocharger optionally includes one or more of the first through seventh examples and further includes water jacket positioned within a space separating the stator from an inner surface of the stator casing, the water jacket surrounding the stator around a circumference of the stator. A ninth example of the electric turbocharger optionally includes one or more of the first through eighth examples and further includes, wherein the plurality of bolts are arranged around a circumference of the bearing casing and wherein the compressor bearing casing is coupled to the compressor casing via a plurality of fasteners arranged around an outer flange of the compressor bearing casing, around a circumference of the outer flange and wherein the plurality of bolts are arranged in the compressor bearing casing at a radial position that is closer to a rotational axis of the shaft than the plurality of fasteners. A tenth example of the electric turbocharger optionally includes one or more of the first through ninth examples and further includes only a single piston ring seal arranged at each end of the shaft, including a first piston ring seal arranged around an inner end of the compressor wheel, between the compressor wheel and the compressor bearing casing and a second piston ring seal arranged around an inner end of the turbine wheel, between the turbine wheel and the turbine bearing casing. An eleventh example of the electric turbocharger optionally includes one or more of the first through tenth examples and further includes, wherein the turbine casing includes a vaneless turbine nozzle integrated as one piece with a remainder of the turbine casing.

As another embodiment, an electric turbocharger for a locomotive includes a turbine casing housing a turbine wheel and a compressor casing housing a boreless compressor wheel; a bearing casing surrounding a shaft connecting the turbine wheel to the compressor wheel, a first end of the shaft directly connected to an internal end of the compressor wheel and a second end of the shaft directly connected to an internal end of the turbine wheel, the internal ends of the turbine wheel and compressor wheel facing the bearing casing, the shaft extending only a portion of a distance into each of the turbine wheel and compressor wheel, the distance arranged coaxial with a rotational axis of the shaft, the bearing casing housing a plurality of bearings adapted to support rotation of the shaft; and an electric motor housed within the bearing casing and mounted on and around the shaft and including a rotor surrounded by a stator, the stator having ends housing internal circuitry of the electric motor, the ends extending outward from a remaining portion of the stator and surrounding a portion of the plurality of bearings, in a radial direction relative to the rotational axis. In a first example of the electric turbocharger, the shaft does not extend through an entirety of the compressor wheel or through an entirety of the turbine wheel and wherein the first end of the shaft is threaded into the internal end of the compressor wheel and the second end of the shaft is threaded into the internal end of the turbine wheel. A second example of the electric turbocharger optionally includes the first example and further includes, wherein the portion of the distance into the turbine wheel is arranged inward, in a direction of the rotational axis and relative to the bearing casing, of blades of the turbine wheel and wherein the portion of the distance into the compressor wheel is arranged inward of blades of the compressor wheel. A third example of the electric turbocharger optionally includes one or more of the first and second examples and further includes a plurality of bolts arranged around a circumference of the bearing casing, each bolt of the plurality of bolts extending parallel to the shaft and from an outer face of a first side of the bearing casing, through an entirety of the bearing casing and a second side of the bearing casing, and into the turbine casing, the first side of the bearing casing arranged adjacent to and in face-sharing contact with the compressor casing. A fourth example of the electric turbocharger optionally includes one or more of the first through third examples and further includes, wherein the bearing casing is split into a turbine bearing casing, compressor bearing casing, and a stator casing, the stator casing positioned between and in face-sharing contact with each of the turbine bearing casing and compressor bearing casing and housing the electric motor and wherein the plurality of bearings are sleeve bearings.

As yet another embodiment, an electric turbocharger for a locomotive includes a turbine casing housing a turbine wheel and a compressor casing housing a compressor wheel; a bearing casing surrounding a shaft connecting the turbine wheel and the compressor wheel, the bearing casing split into a turbine bearing casing, compressor bearing casing, and a stator casing, the stator casing arranged between the turbine bearing casing and the compressor bearing casing and housing an electric motor mounted on and around the shaft; a first water jacket arranged within the stator casing, between the electric motor and an inner surface of the stator casing, in a radial direction relative to a rotational axis of the shaft; and a second water jacket arranged within the turbine bearing casing and surrounding a portion of the shaft. In a first example of the electric turbocharger, the second water jacket includes an annular portion surrounding the portion of the shaft and a plurality of extending portions, each extending outward from the annular portion, relative to the shaft, and spaced apart from adjacent extending portions of the plurality of extending portions, where outer ends of the extending portions are spaced apart from an outer surface of the turbine bearing casing. A second example of the electric turbocharger optionally includes the first example and further includes a plurality of bolts arranged around a circumference of the bearing casing, each bolt of the plurality of bolts extending parallel to the shaft and from an outer face of the compressor bearing casing, through the stator casing and turbine bearing casing, and into the turbine casing, wherein each bolt of the plurality of bolts is positioned between a different pair of adjacent extending portions of the plurality of extending portions, and wherein the second water jacket further includes smooth, curved transitions between each extending portion of the plurality of extending portions and the annular portion.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An electric turbocharger, comprising:
a turbine casing housing a turbine wheel and a compressor casing housing a compressor wheel;
a bearing casing surrounding a shaft connecting the turbine wheel and the compressor wheel, the bearing casing split into a turbine bearing casing, compressor bearing casing, and a stator casing, the stator casing positioned between the turbine bearing casing and compressor bearing casing and housing an electric motor mounted on and around the shaft; and
a plurality of bolts, each bolt of the plurality of bolts extending parallel to the shaft and from an outer face of the compressor bearing casing, through the stator casing and the turbine bearing casing, and into the turbine casing.

2. The electric turbocharger of claim 1, wherein the shaft couples to innermost ends of each of the turbine wheel and the compressor wheel through respective threaded joints, the innermost ends being ends of the respective turbine wheel and compressor wheel arranged closest to the bearing casing.

3. The electric turbocharger of claim 1, wherein the electric motor is a permanent magnet motor including a rotor integrated into the shaft and a stator surrounding the rotor, around an outer circumference of the rotor.

4. The electric turbocharger of claim 3, wherein the stator includes a central portion surrounding the rotor, along a length of the rotor, and end turns extending outward from the central portion, in a direction of a rotational axis of the shaft, past ends of the rotor and over a portion of bearings of the shaft.

5. The electric turbocharger of claim 4, wherein the bearings of the shaft include two sleeve bearings surrounding the shaft, a first sleeve bearing of the two sleeve bearings arranged in the compressor bearing casing and a second sleeve bearing of the two sleeve bearings arranged in the turbine bearing casing.

6. The electric turbocharger of claim 5, further comprising a thrust bearing arranged around the shaft in the compressor bearing casing, the thrust bearing arranged outside of the first sleeve bearing, between an end of the shaft directly coupled to the compressor wheel and the first sleeve bearing.

7. The electric turbocharger of claim 4, wherein the end turns include internal circuitry of the stator, where the internal circuitry of the stator is electrically coupled to electrical contacts arranged on an exterior of the stator casing via electrical connections running through the stator casing, from the end turns to the electrical contacts.

8. The electric turbocharger of claim 7, wherein the electrical contacts are arranged on a compressor side of the stator casing, adjacent to the compressor bearing casing, and wherein the electrical contacts extend outward from an outer surface of the stator casing, in direction perpendicular to the rotational axis.

9. The electric turbocharger of claim 1, further comprising a water jacket positioned within a space separating the stator from an inner surface of the stator casing, the water jacket surrounding the stator around a circumference of the stator.

10. The electric turbocharger of claim 1, wherein the plurality of bolts are arranged around a circumference of the bearing casing and wherein the compressor bearing casing is coupled to the compressor casing via a plurality of fasteners arranged around an outer flange of the compressor bearing casing, around a circumference of the outer flange and wherein the plurality of bolts are arranged in the compressor bearing casing at a radial position that is closer to a rotational axis of the shaft than the plurality of fasteners.

11. The electric turbocharger of claim 1, further comprising only a single piston ring seal arranged at each end of the shaft, including a first piston ring seal arranged around an inner end of the compressor wheel, between the compressor wheel and the compressor bearing casing and a second piston ring seal arranged around an inner end of the turbine wheel, between the turbine wheel and the turbine bearing casing.

12. The electric turbocharger of claim 1, wherein the turbine casing includes a vaneless turbine nozzle integrated as one piece with a remainder of the turbine casing.

13. An electric turbocharger for a locomotive, comprising:
a turbine casing housing a turbine wheel and a compressor casing housing a boreless compressor wheel;
a bearing casing surrounding a shaft connecting the turbine wheel to the compressor wheel, the bearing casing split into a turbine bearing casing, compressor bearing casing, and a stator casing, a first end of the shaft directly connected to an internal end of the compressor wheel and a second end of the shaft directly connected to an internal end of the turbine wheel, the internal ends of the turbine wheel and compressor wheel facing the bearing casing, the shaft extending only a portion of a distance into each of the turbine wheel and compressor wheel, the distance arranged coaxial with a rotational axis of the shaft, the bearing casing housing a plurality of bearings adapted to support rotation of the shaft;
a plurality of bolts, each bolt of the plurality of bolts extending parallel to the shaft and from an outer face of the compressor bearing casing, through the stator casing and the turbine bearing casing, and into the turbine casing; and
an electric motor housed within the bearing casing and mounted on and around the shaft and including a rotor surrounded by a stator, the stator having ends housing internal circuitry of the electric motor, the ends extending outward from a remaining portion of the stator and surrounding a portion of the plurality of bearings, in a radial direction relative to the rotational axis.

14. The electric turbocharger of claim 13, wherein the shaft does not extend through an entirety of the compressor wheel or through an entirety of the turbine wheel and wherein the first end of the shaft is threaded into the internal end of the compressor wheel and the second end of the shaft is threaded into the internal end of the turbine wheel.

15. The electric turbocharger of claim 13, wherein the portion of the distance into the turbine wheel is arranged inward, in a direction of the rotational axis and relative to the bearing casing, of blades of the turbine wheel and wherein the portion of the distance into the compressor wheel is arranged inward of blades of the compressor wheel.

16. The electric turbocharger of claim 13, further comprising a plurality of bolts arranged around a circumference of the bearing casing, each bolt of the plurality of bolts extending parallel to the shaft and from an outer face of a first side of the bearing casing, through an entirety of the bearing casing and a second side of the bearing casing, and into the turbine casing, the first side of the bearing casing arranged adjacent to and in face-sharing contact with the compressor casing.

17. The electric turbocharger of claim 13, wherein the bearing casing is split into a turbine bearing casing, compressor bearing casing, and a stator casing, the stator casing positioned between and in face-sharing contact with each of the turbine bearing casing and compressor bearing casing and housing the electric motor and wherein the plurality of bearings are sleeve bearings.

18. An electric turbocharger for a locomotive, comprising:
a turbine casing housing a turbine wheel and a compressor casing housing a compressor wheel;
a bearing casing surrounding a shaft connecting the turbine wheel and the compressor wheel, the bearing casing split into a turbine bearing casing, compressor bearing casing, and a stator casing, the stator casing arranged between the turbine bearing casing and the compressor bearing casing and housing an electric motor mounted on and around the shaft;
a plurality of bolts, each bolt of the plurality of bolts extending parallel to the shaft and from an outer face of the compressor bearing casing, through the stator casing and the turbine bearing casing, and into the turbine casing;
a first water jacket arranged within the stator casing, between the electric motor and an inner surface of the stator casing, in a radial direction relative to a rotational axis of the shaft; and
a second water jacket arranged within the turbine bearing casing and surrounding a portion of the shaft.

19. The electric turbocharger of claim 18, wherein the second water jacket includes an annular portion surrounding the portion of the shaft and a plurality of extending portions, each extending outward from the annular portion, relative to the shaft, and spaced apart from adjacent extending portions of the plurality of extending portions, where outer ends of the extending portions are spaced apart from an outer surface of the turbine bearing casing.

20. The electric turbocharger of claim 19, wherein each bolt of the plurality of bolts is positioned between a different pair of adjacent extending portions of the plurality of extending portions, and wherein the second water jacket further includes smooth, curved transitions between each extending portion of the plurality of extending portions and the annular portion.

* * * * *